US008588039B1

(12) United States Patent
Shi et al.

(10) Patent No.: US 8,588,039 B1
(45) Date of Patent: Nov. 19, 2013

(54) ENERGY-ASSISTED MAGNETIC RECORDING HEAD HAVING MULTIPLE CORES OF DIFFERENT LENGTHS

(75) Inventors: Zhong Shi, Dublin, CA (US); Kuochou Tai, Fremont, CA (US); Shing Lee, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 300 days.

(21) Appl. No.: 13/039,216

(22) Filed: Mar. 2, 2011

(51) Int. Cl.
*G11B 11/00* (2006.01)

(52) U.S. Cl.
USPC .................................. 369/13.33; 369/13.13

(58) Field of Classification Search
USPC ........ 369/13.33, 13.13, 13.32, 13.02, 112.09,
369/112.14, 112.21, 112.27, 300; 360/59;
385/129, 31, 88–94;
29/603.07–603.27; 250/201.3, 201.5
See application file for complete search history.

(56) References Cited

U.S. PATENT DOCUMENTS

| 6,238,943 | B1 | 5/2001 | Kobayashi et al. |
| 7,715,667 | B2 | 5/2010 | Lee et al. |
| 2008/0002529 | A1* | 1/2008 | Sekine et al. ............... 369/13.33 |
| 2008/0049563 | A1* | 2/2008 | Konno et al. ............... 369/13.33 |
| 2009/0052076 | A1* | 2/2009 | Shimazawa et al. ........ 369/13.33 |
| 2009/0303858 | A1* | 12/2009 | Kuiseko et al. ............. 369/13.33 |
| 2010/0092144 | A1 | 4/2010 | Blauvelt et al. |
| 2011/0205866 | A1* | 8/2011 | Osawa et al. ............... 369/13.33 |
| 2012/0182842 | A1* | 7/2012 | Iwanabe et al. ............ 369/13.33 |

OTHER PUBLICATIONS

W. A. Challener, et al., "Heat-assisted magnetic recording by a near-field transducer with efficient optical energy transfer", Nature Photonics vol. 3, Apr. 2009, pp. 220-224.

* cited by examiner

*Primary Examiner* — Tan X Dinh (57) ABSTRACT

A method and system for providing a waveguide for an energy assisted magnetic recording (EAMR) transducer is described. The EAMR transducer has an air-bearing surface (ABS) that resides in proximity to a media during use and is coupled with a laser that provides energy. The EAMR transducer includes a write pole that writes to a region of the media and coil(s) that energize the write pole. The waveguide includes first and second cladding layers, a core, and assistant cores. The core is configured to direct the energy from the laser toward the ABS and has a core length. The core resides between the first and second cladding layers. A first portion of the assistant cores resides in the first cladding layer. A second portion of the assistant cores is in the second cladding layer. Each assistant core has an assistant core length less than the core length.

27 Claims, 8 Drawing Sheets

Side View

Top View
FIG. 3

ENERGY-ASSISTED MAGNETIC RECORDING HEAD HAVING MULTIPLE CORES OF DIFFERENT LENGTHS

BACKGROUND

Figure 1:
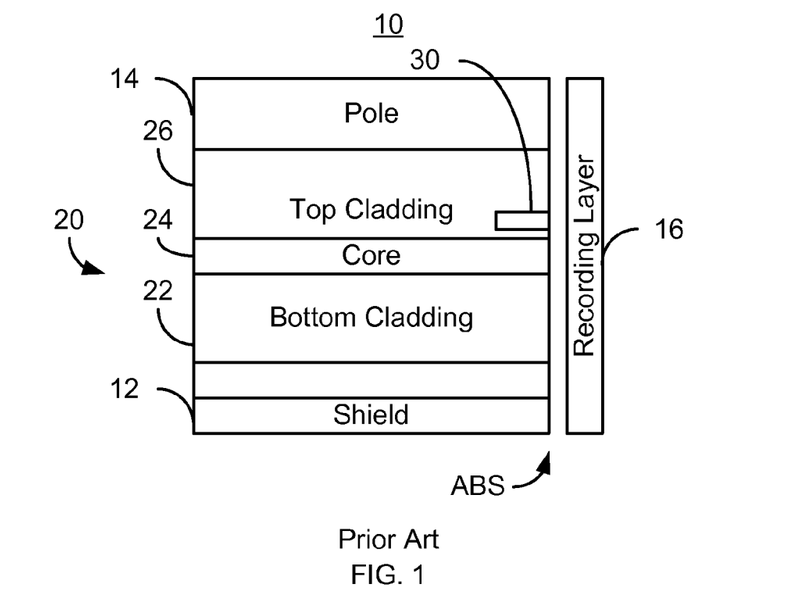
FIG. 1 is a diagram depicting a conventional EAMR transducer.

FIG. 1 depicts a portion of a conventional energy assisted magnetic recording (EAMR) transducer 10 as well as recording media 16. For clarity, FIG. 1 is not to scale. The conventional EAMR transducer 10 is used in writing to the recording media 16. The EAMR transducer 10 receives light, or energy, from a conventional laser (not shown in FIG. 1). The conventional EAMR transducer 10 includes a conventional waveguide 20, which directs the light toward the media 16. The conventional waveguide typically includes a core 24 and cladding 22 and 26. Also shown are a conventional shield 12, a conventional pole 14, and a conventional near-field transducer (NFT) 30. Light from a laser (not shown) is incident on the grating (not shown), which couples light to the waveguide 20. Light is guided by the conventional waveguide 20 to the NFT 30 near the air-bearing surface (ABS). The light interacts with the NFT 30, which absorbs part of the optical energy and forms very strong localized electromagnetic field. When the localized electromagnetic field is close enough to the recording media 16, the recording media also absorbs part of the localized electromagnetic field and is heated. The pole 14 is then used to write to the heated region.

Although the conventional EAMR transducer 10 may function, it may be inefficient. The media recording efficiency is the ratio of the energy being absorbed by the magnetic recording medium to the incident optical energy. In the conventional EAMR transducer, the media absorption efficiency may be low. This low efficiency may be due to a number of factors. For example, there may be losses when light is coupled from the laser to the conventional waveguide 20. Such losses may be particularly significant if the laser is directly coupled (e.g. butt coupled) to the conventional waveguide 20. Efficiency of the EAMR transducer 10 is adversely affected.

Accordingly, what is needed is a system and method for improving efficiency and performance of the EAMR transducer.

BRIEF SUMMARY OF THE INVENTION

A method and system for providing a waveguide for an energy assisted magnetic recording (EAMR) transducer is described. The EAMR transducer has an air-bearing surface (ABS) that resides in proximity to a media during use. The EAMR transducer is also coupled with a laser that provides energy. The EAMR transducer includes a write pole that writes to a region of the media and coil(s) that energize the write pole. The waveguide includes first and second cladding layers, a core, and assistant cores. The core is configured to direct the energy from the laser toward the ABS and has a core length. The core resides between the first and second cladding layers. A first portion of the assistant cores resides in the first cladding layer. A second portion of the assistant cores is in the second cladding layer. Each assistant core has an assistant core length less than the core length

DETAILED DESCRIPTION OF THE EMBODIMENTS OF THE INVENTION

Figure 2:
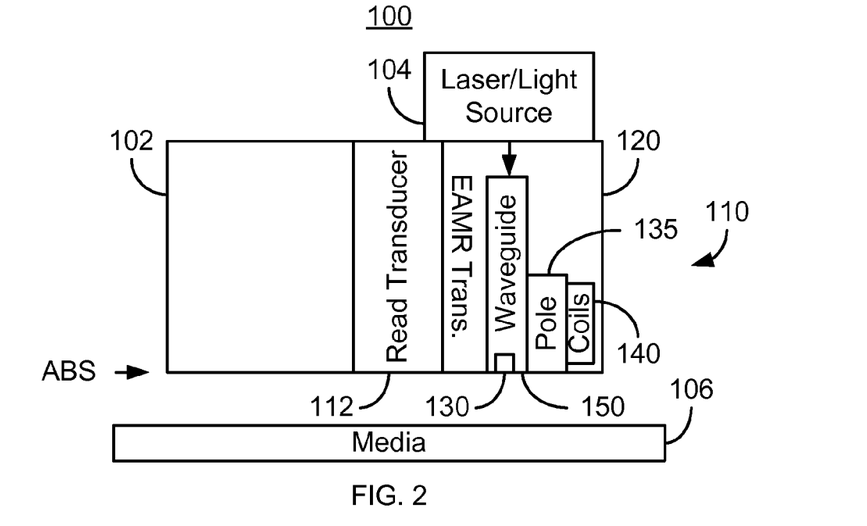
FIG. 2 is a diagram depicting an exemplary embodiment of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes a slider 102, a laser/light source 104, media 106, and an EAMR head 110. In some embodiments, the laser 104 is a laser diode. Although shown as mounted on the slider 102, the laser 104 may be coupled with the slider 102 in another fashion. For example, the laser 104 might be mounted on a suspension (not shown in FIG. 2) to which the slider 102 is also attached. The laser 104 may also be oriented differently and/or optically coupled with the EAMR transducer 120 in another manner. For example, optics (not shown) such as a mirror or other mechanism for redirecting optical energy from the laser may be used. The media 108 may include multiple layers, which are not shown in FIG. 2 for simplicity.

The EAMR head 110 includes an EAMR transducer 120. The EAMR head 110 may also include an optional read transducer 112. The read transducer may be included if the EAMR head 110 is a merged head. Such a read transducer 112 might include shields and a read sensor such as a giant magnetoresistance or tunneling magnetoresistance sensor. The EAMR transducer 120 includes an NFT 130, pole(s) 135, coil(s) 140, and at least one waveguide 150. The EAMR transducer 120 may also include other pole(s) such as return poles, shield(s), heat sink(s) and other components for writing to the media 106. Further, light (depicted as an arrow) form the laser 104 is shown as being directly coupled into the waveguide 150. However, in other embodiments, a grating or other input mechanism for coupling light to the waveguide 150 may be used.

Figure 3:
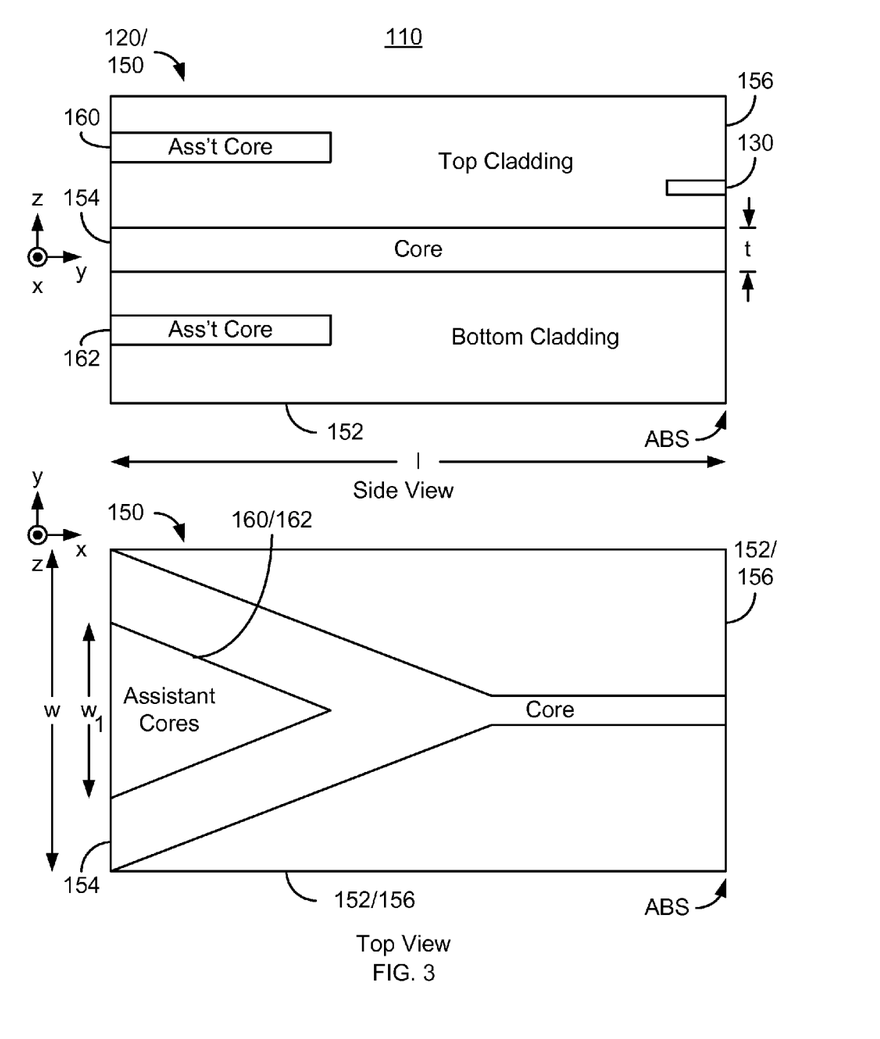
FIG. 3 is a diagram depicting a side view of an exemplary embodiment of a waveguide that may be used in an EAMR transducer.

FIG. 3 is a diagram depicting top and side views of an exemplary embodiment of a portion of the EAMR head 110 shown in FIG. 2. Consequently, analogous components are labeled similarly. In particular, the waveguide 150 and NFT 130 are shown. In other embodiments, the NFT 130 might be omitted. For simplicity, FIG. 3 is not to scale. In addition, portions of the EAMR transducer 120 may be omitted in FIG. 3. For example, pole(s), coil(s), and/or shields may be omitted. In some embodiments, the laser (not shown in FIG. 3) is directly coupled to the waveguide 150. Thus, the light energy from the laser is provided directly to the end of the waveguide 150 opposite from the ABS. In other embodiments, a grating (not shown) may be used to couple light from the laser 104 into the EAMR transducer 120.

The waveguide 150 includes cladding layers 152 and 156, core 154, and assistant cores 160 and 162. The waveguide 150 directs the energy from the laser 104 toward the ABS. More specifically, the core 154 directs energy from the laser 104 (not shown in FIG. 3) toward the NFT 130. The core 154 is configured to support the desired mode(s) of light energy in the waveguide 150 and, in the embodiment shown, runs the length, l, of the waveguide 150. Thus, the core 154 terminates at the ABS and the opposing end of the waveguide. In some embodiments, the thickness of the core, t, is on the order of one hundred fifty nanometers. However, other thicknesses may be used in other embodiments. The core 154 is also tapered. The core 154 has an index of refraction and may include materials such as $Ta_2O_5$, $TiO_2$, and $Si_3N_4$. The cladding layers 152 and 156 typically have lower indices of refraction than the core 154. For example, the cladding layers 152 and 156 may include materials such as aluminum oxide, magnesium fluoride, and/or silicon oxide.

The waveguide 150 also includes assistant cores 160 and 162 residing in the cladding 156 and 152, respectively. The assistant cores 160 and 162 are shorter than the core 154. In the embodiment shown, the assistant cores 160 and 162 do not extend to the ABS. In addition, in the embodiment shown the assistant cores 160 and 162 are tapered. Thus, at the end of the waveguide 150 opposite to the ABS, the assistant cores 160 and 162 have a width, $w_1$. This width decreases closer to the ABS. The width of the assistant cores 160 and 162 at the end opposite to the ABS is shown as less than the width, w, of the core 154. However, in other embodiments, the assistant cores 160 and 162 have the same width as the core at the end opposite to the ABS. In other embodiments, the assistant cores 160 and 162 may also taper to a greater or lesser degree and may not taper at all. Although shown as having the same length, width (w), and shape, the assistant cores 160 and 162 may have different lengths, widths and shapes. The assistant cores 160 and 162 have indices of refraction similar to that of the core 154 and may include materials such as $Ta_2O_5$, $TiO_2$, and $Si_3N_4$. However, there is no requirement that the index of refraction one assistant core 160 or 162 match that of the other assistant core 162 or 160, respectively. Further, there is no requirement that the indices of refraction of the assistant cores 160 and 162 be the same as that of the core 154. The assistant cores 160 and 162 are shown as being symmetrically placed around the core 154 and being symmetric with respect to the core 154. However, in other embodiments, the assistant cores 160 and 162 may not be. Finally, although only two assistant cores 160 and 162 are shown, another number of assistant cores are possible. Finally, the assistant cores 160 and 162 are shown as thinner than the core 154. However, other thicknesses may be used in other embodiments.

The assistant cores 160 and 162 aid in coupling the energy from the laser (not shown in FIG. 3) into the waveguide. In particular the coupling efficiency and alignment tolerance of the waveguide 150 may be improved by the presence of the assistant cores 160 and 162. The assistant cores 160 and 162 are further from the center of the waveguide 150 than the core 154 in the z direction. The assistant cores 160 and 162 thus couple in portions of the laser energy that may otherwise be lost. Further, as can be seen in a comparison of the top and side views of FIG. 3, the presence of the assistant cores 160 and 162 allows tapering of cores not only in the x and y directions, but also in the z direction. Thus, the waveguide 120 tapers continuously in the x and y directions as well as discretely in the z-direction. Consequently, energy coupled by the assistant cores 160/162 may be more efficiently delivered to the core 154. Thus, the alignment tolerance and efficiency of the waveguide 150 may be improved.

Figure 4:
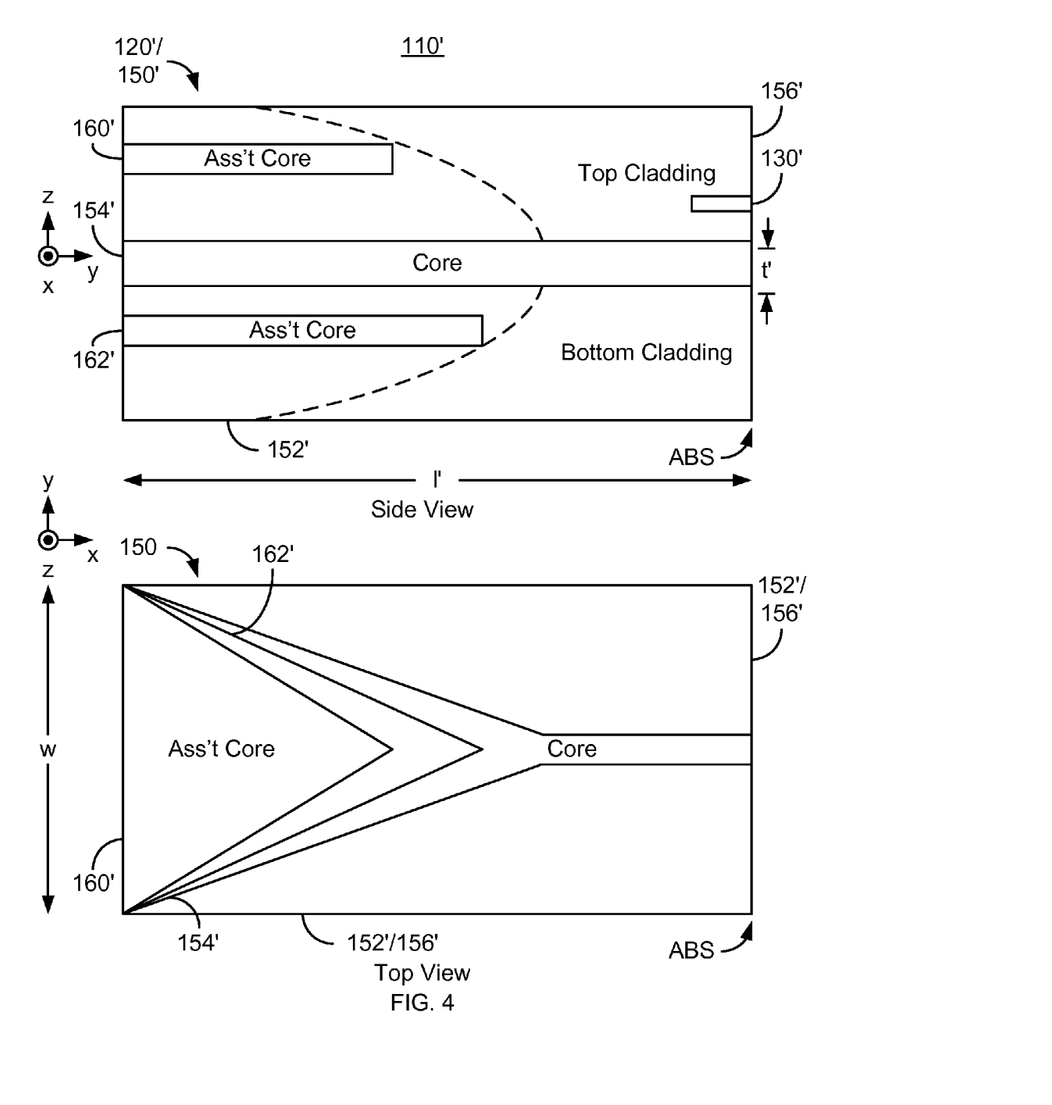
FIG. 4 is a diagram depicting another exemplary embodiment of a waveguide that may be used in an EAMR transducer.

FIG. 4 is a diagram depicting top and side views of another exemplary embodiment of a portion of the EAMR head 110 shown in FIGS. 2 and 3. Consequently, analogous components are labeled similarly. In particular, the waveguide 150' and NFT 130' are shown. In other embodiments, the NFT 130' might be omitted. For simplicity, FIG. 4 is not to scale. In addition, portions of the EAMR transducer 120' may be omitted in FIG. 4. For example, pole(s), coil(s), and/or shields may be omitted. In some embodiments, the laser (not shown in FIG. 4) is directly coupled to the waveguide 150'. Thus, the light energy from the laser is provided directly to the end of the waveguide 150' opposite from the ABS. In other embodiments, a grating (not shown) and/or other device may be used to couple light from the laser 104 into the EAMR transducer 120'.

The waveguide 150' includes cladding layers 152' and 156', core 154', and assistant cores 160' and 162'. The waveguide 150' directs the energy from the laser 104 toward the ABS. More specifically, the core 154' directs energy from the laser 104 (not shown in FIG. 4) toward the NFT 130'. The core 154' is configured to support the desired mode(s) of light energy in the waveguide 150' and, in the embodiment shown, runs the length, l', of the waveguide 150'. Thus, the core 154' terminates at the ABS and the opposing end of the waveguide. In some embodiments, the thickness of the core, t', is on the order of one hundred fifty nanometers. However, other thicknesses may be used in other embodiments. The core 154' is also tapered. The core 154' has an index of refraction and may include materials such as $Ta_2O_5$, $TiO_2$, and $Si_3N_4$. The cladding layers 152' and 156' typically have lower indices of refraction than the core 154'. For example, the cladding layers 152' and 156' may include materials such as aluminum oxide, magnesium fluoride, and/or silicon oxide.

The waveguide 150' also includes assistant cores 160' and 162' residing in the cladding 156' and 152', respectively. The assistant cores 160' and 162' are shorter than the core 154'. In the embodiment shown, the assistant cores 160' and 162' do not extend to the ABS. In addition, in the embodiment shown the assistant cores 160' and 162' are tapered. Thus, at the end of the waveguide 150' opposite to the ABS, the assistant cores 160' and 162' have a width, w. This width decreases closer to the ABS. The width of the assistant cores 160' and 162' at end opposite to the ABS is shown as equal to the width, w, of the core 154. However, in other embodiments, the assistant cores 160' and 162' may have other widths at the end opposite to the ABS. In other embodiments, the assistant cores 160' and 162' may also taper to a greater or lesser degree and may not taper at all. The assistant cores 160' and 162' have different lengths, which decrease with increasing distance from the core 154'. In the embodiments shown, the shapes of the assistant cores 160' and 162' are the same (i.e. both triangular). However, in other embodiments, the shapes of the assistant cores 160' and 162' may differ. The assistant cores 160' and 162' have indices of refraction similar to that of the core 154' and may include materials such as $Ta_2O_5$, $TiO_2$, and $Si_3N_4$. However, there is no requirement that the index of refraction one assistant core 160' or 162' match that of the other assistant core 162' or 160', respectively. Further, there is no requirement that the indices of refraction of the assistant cores 160' and 162' be the same as that of the core 154'. The assistant cores 160' and 162' are shown as being on opposite sides of the core 154', but different distances from the core 154'. However, in other embodiments, the assistant cores 160' and 162' may not be. Finally, although only two assistant cores 160' and 162' are shown, another number of assistant cores are possible. Finally, the assistant cores 160' and 162' are shown as thinner than the core 154'. However, other thicknesses may be used in other embodiments.

The assistant cores 160' and 162' function in an analogous manner to the assistant cores 160 and 162. Thus, the assistant cores 160' and 162' aid in coupling the energy from the laser (not shown in FIG. 4) into the waveguide 150'. The assistant cores 160' and 162' allow for a taper (shown by the dashed line in the side view) in the y and z directions. For the reasons discussed above with respect to the waveguide 150, the coupling efficiency and alignment tolerance of the waveguide 150' may be improved by the presence of the assistant cores 160' and 162'.

Figure 5:
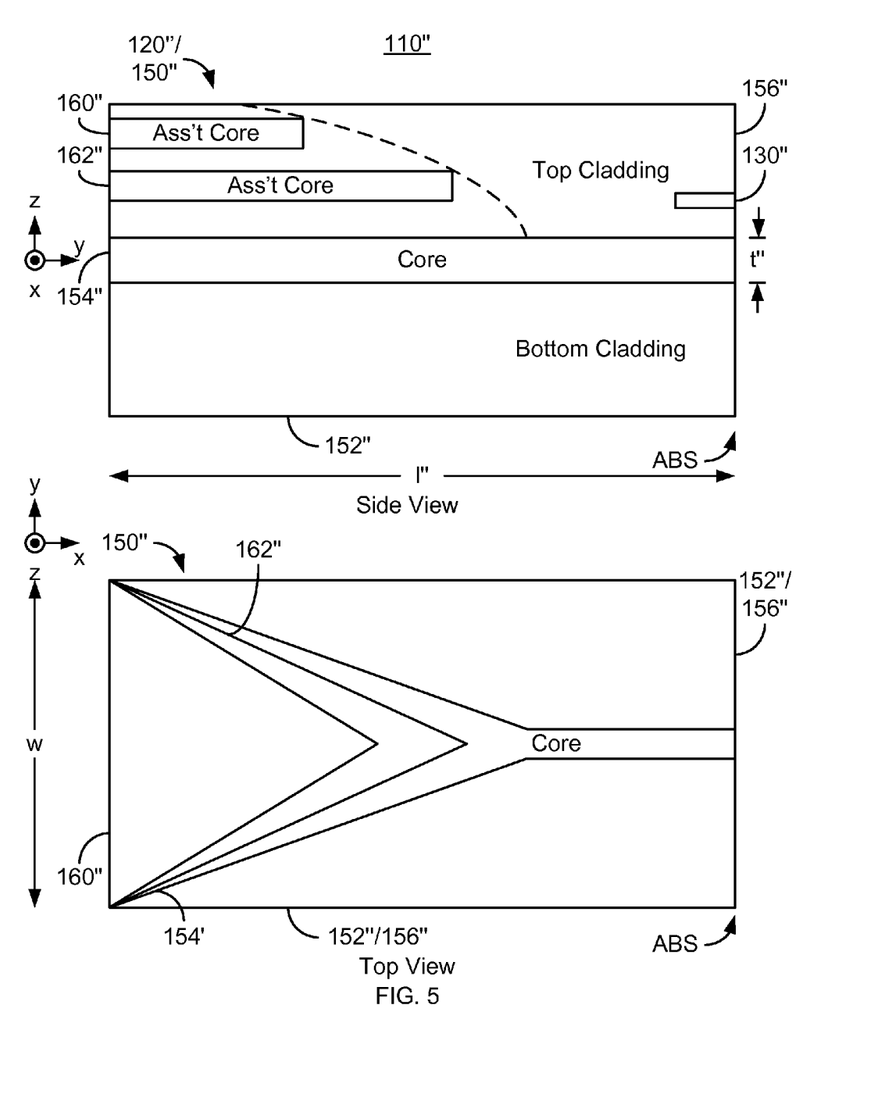
FIG. 5 is a diagram depicting another exemplary embodiment of a waveguide that may be used in an EAMR transducer.

FIG. 5 is a diagram depicting top and side views of another exemplary embodiment of a portion of the EAMR head 110/110' shown in FIGS. 2-4. Consequently, analogous components are labeled similarly. In particular, the waveguide 150" and NFT 130" are shown. In other embodiments, the NFT 130" might be omitted. For simplicity, FIG. 5 is not to scale. In addition, portions of the EAMR transducer 120" may be omitted in FIG. 5. For example, pole(s), coil(s), and/or shields may be omitted. In some embodiments, the laser (not shown in FIG. 5) is directly coupled to the waveguide 150". Thus, the light energy from the laser is provided directly to the end of the waveguide 150" opposite from the ABS. In other embodiments, a grating and/or other device (not shown) may be used to couple light from the laser 104 into the EAMR transducer 120".

The waveguide 150" includes cladding layers 152" and 156", core 154", and assistant cores 160" and 162". The waveguide 150" directs the energy from the laser 104 toward the ABS. More specifically, the core 154" directs energy from the laser 104 (not shown in FIG. 5) toward the NFT 130". The core 154" is configured to support the desired mode(s) of light energy in the waveguide 150" and, in the embodiment shown, runs the length, l", of the waveguide 150". Thus, the core 154" terminates at the ABS and the opposing end of the waveguide. In some embodiments, the thickness of the core, t", is on the order of one hundred fifty nanometers. However, other thicknesses may be used in other embodiments. As can be seen in the top view, the core 154" is also tapered. The core 154" has an index of refraction and may include materials such as $Ta_2O_5$, $TiO_2$, and $Si_3N_4$. The cladding layers 152" and 156" typically have lower indices of refraction than the core 154". For example, the cladding layers 152" and 156" may include materials such as aluminum oxide, magnesium fluoride, and/or silicon oxide.

The waveguide 150" also includes assistant cores 160" and 162" residing in the cladding 156". In other embodiments, the assistant cores 160" and 162" might both reside in the cladding 152". The assistant cores 160" and 162" are shorter than the core 154". In the embodiment shown, the assistant cores 160" and 162" do not extend to the ABS. In addition, in the embodiment shown the assistant cores 160" and 162" are tapered. Thus, at the end of the waveguide 150" opposite to the ABS, the assistant cores 160" and 162" have a width, w. This width decreases closer to the ABS. The width of the assistant cores 160" and 162" at the end opposite to the ABS is shown as equal to the width, w, of the core 154". However, in other embodiments, the assistant cores 160" and 162" may have other widths at the end opposite to the ABS. In other embodiments, the assistant cores 160" and 162" may also taper to a greater or lesser degree and may not taper at all. The assistant cores 160" and 162" have different lengths, which decrease with increasing distance from the core 154". In the embodiments shown, the shapes of the assistant cores 160" and 162" are the same (i.e. both triangular). However, in other embodiments, the shapes of the assistant cores 160" and 162" may differ. The assistant cores 160" and 162" have indices of refraction similar to that of the core 154" and may include materials such as $Ta_2O_5$, $TiO_2$, and $Si_3N_4$. However, there is no requirement that the index of refraction one assistant core 160' or 162' match that of the other assistant core 162' or 160', respectively. Further, there is no requirement that the indices of refraction of the assistant cores 160" and 162" be the same as that of the core 154". The assistant cores 160" and 162" are shown as being on the same side of the core 154". Finally, although only two assistant cores 160" and 162" are shown, another number of assistant cores are possible. Finally, the assistant cores 160" and 162" are shown as thinner than the core 154'. However, other thicknesses may be used in other embodiments.

The assistant cores 160" and 162" function in an analogous manner to the assistant cores 160/160' and 162/162'. Thus, the assistant cores 160" and 162" aid in coupling the energy from the laser (not shown in FIG. 5) into the waveguide. The assistant cores 160" and 162" allow for a taper (shown by the dashed line in the side view) in the y and z directions. For the reasons discussed above with respect to the waveguide 150, the coupling efficiency and alignment tolerance of the waveguide 150" may be improved by the presence of the assistant cores 160" and 162'". However, as the assistant cores 160" and 162" are on the same side of the core 154", this improvement is expected to be less than for the waveguides 150 and 150'.

Figure 6:
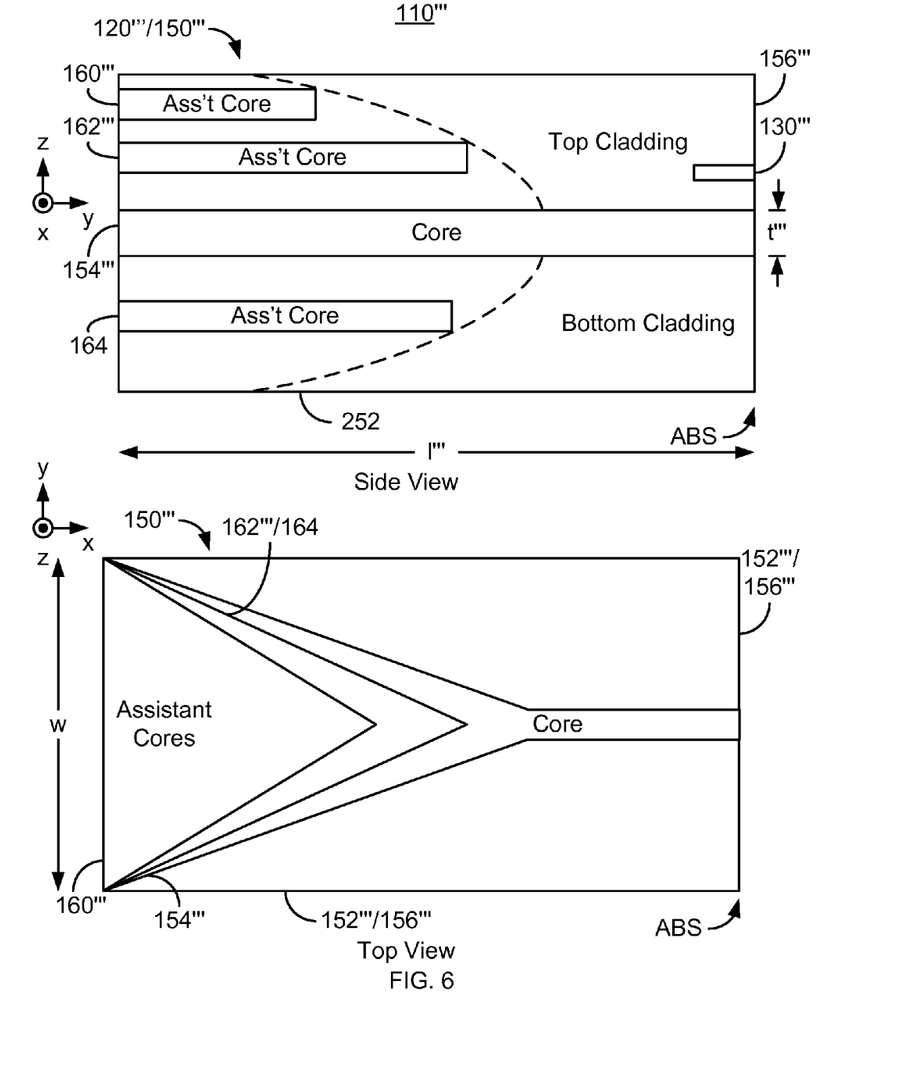
FIG. 6 is a diagram depicting another exemplary embodiment of a waveguide that may be used in an EAMR transducer.

FIG. 6 is a diagram depicting top and side views of another exemplary embodiment of a portion of an EAMR head 110'". The EAMR head 110'" is analogous to the EAMR head 110/110'/110" shown in FIGS. 2-5. Consequently, analogous components are labeled similarly. In other embodiments, the NFT 130'" might be omitted. For simplicity, FIG. 6 is not to scale. In addition, portions of the EAMR transducer 120'" may be omitted in FIG. 6. For example, pole(s), coil(s), and/or shields may be omitted. In some embodiments, the laser (not shown in FIG. 6) is directly coupled to the waveguide 150'". Thus, the light energy from the laser is provided directly to the end of the waveguide 150'" opposite from the ABS. In other embodiments, a grating and/or other device (not shown) may be used to couple light from the laser 104 into the EAMR transducer 120'".

The waveguide 150'" directs the energy from the laser 104 toward the ABS. More specifically, the core 154'" directs energy from the laser 104 (not shown in FIG. 6) toward the NFT 130'". The core 154'" is configured to support the desired mode(s) of light energy in the waveguide 150'" and, in the embodiment shown, runs the length, l'", of the waveguide 150". Thus, the core 154'" terminates at the ABS and the opposing end of the waveguide. In some embodiments, the thickness of the core, t'", is on the order of one hundred fifty nanometers. However, other thicknesses may be used in other embodiments. As can be seen in the top view, the core 154'" is also tapered. The core 154'" has an index of refraction and may include materials such as $Ta_2O_5$, $TiO_2$, and $Si_3N_4$. The cladding layers 152'" and 156'" typically have lower indices of refraction than the core 154'". For example, the cladding layers 152'" and 156'" may include materials such as aluminum oxide, magnesium fluoride, and/or silicon oxide.

Assistant cores 160'" and 162'" reside in the cladding 156'", while the assistant core 164 is in the cladding 152'". Although the positions of the assistant cores 160'", 162'", and 164 are asymmetric, assistant cores exist in both the top cladding 156''' and the bottom cladding 152'''. The assistant cores 160''', 162''', and 164 are shorter than the core 154'''. In the embodiment shown, the assistant cores 160''', 162''', and 164 do not extend to the ABS and have different lengths. The lengths of the assistant cores 160''', 162''', and 164 increase with increasing distance from the core 154'''. In addition, in the embodiment shown the assistant cores 160''', 162''', and 164 are tapered. Thus, at the end of the waveguide 150''' opposite to the ABS, the assistant cores 160''', 162''', and 164 have a width, w. This width decreases closer to the ABS. The width of the assistant cores 160''' and 162''' at the end opposite to the ABS is shown as equal to the width, w, of the core 154'''. However, in other embodiments, the assistant cores 160''', 162''', and 164 may have other widths at the end opposite to the ABS. In other embodiments, the assistant cores 160'', 162''', and 164 may also taper to a greater or lesser degree and may not taper at all. The assistant cores 160''', 162''', and 164 have different lengths and different distances from the core 154'''. However, in other embodiments, the lengths and/or distances from the core 154''' of one or more of the assistant cores 160''', 162''', and 164 may be the same. In the embodiments shown, the shapes of the assistant cores 160''', 162''', and 164 are the same (i.e. both triangular). However, in other embodiments, the shapes of the assistant cores 160''', 162''', and 164 may differ. The assistant cores 160''', 162''', and 164 have indices of refraction similar to that of the core 154''' and may include materials such as $Ta_2O_5$, $TiO_2$, and $Si_3N_4$. However, there is no requirement that the index of refraction one assistant cores 160''', 162''', and 164 match that of the other assistant cores 160''', 162''', and 164. Further, there is no requirement that the indices of refraction of the assistant cores 160''', 162''', and 164 be the same as that of the core 154'''. Although only three assistant cores 160''', 162''', and 164 are shown, another number of assistant cores are possible. Finally, the assistant cores 160''', 162''', and 164 are shown as thinner than the core 154'''. However, other thicknesses may be used in other embodiments.

The assistant cores 160''', 162''', and 164 function in an analogous manner to the assistant cores 160/160'/160'' and 162/162'/162''. Thus, the assistant cores 160''', 162''', and 164 aid in coupling the energy from the laser (not shown in FIG. 6) into the waveguide 150'''. For example, the assistant cores 160''', 162''', and 164 may form a taper (shown by a dashed line in the side view of FIG. 6) in the y and z directions. For the reasons discussed above with respect to the waveguide 150/150'/150'', the coupling efficiency and alignment tolerance of the waveguide 150''' may be improved by the presence of the assistant cores 160''', 162''', and 164.

Figure 7:
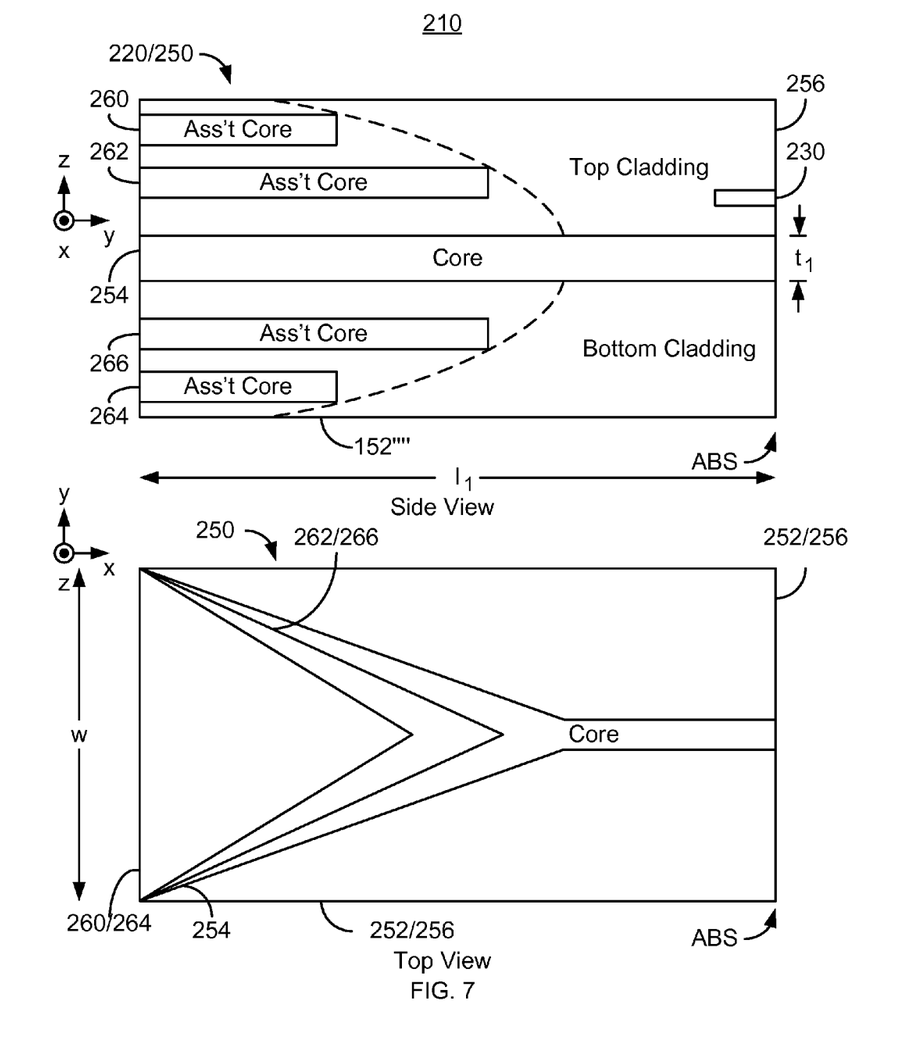
FIG. 7 is a diagram depicting another exemplary embodiment of a waveguide that may be used in an EAMR transducer.

FIG. 7 is a diagram depicting top and side views of another exemplary embodiment 210 of a portion of the EAMR head 110/110'/110''/110''' shown in FIGS. 2-6. Consequently, analogous components are labeled similarly. The EAMR head 210 is analogous to the EAMR head 110/110'/110''/110''' shown in FIGS. 2-6. Consequently, analogous components are labeled similarly. In particular, the waveguide 250 having core 254, cladding 252 and 256, and assistant cores 260, 262, 264, and 266 and NFT 230 is shown. The waveguide 250, core 254, cladding 252 and 256 and assistant cores 260, 262, 264, and 266 are analogous to the waveguide 150/150'/150''/150''', core 154/154'/154''/154''', cladding 152/152'/152'''152'' and 156/156'/156''/156''', and assistant cores 160/160'/160''/160''', 162/162'/162''/162''' and 164, respectively. However, four assistant cores 260, 262, 264, and 266 are included. In other embodiments, the NFT 230 might be omitted. For simplicity, FIG. 7 is not to scale. In addition, portions of the EAMR transducer 220 may be omitted in FIG. 7. For example, pole(s), coil(s), and/or shields may be omitted. In some embodiments, the laser (not shown in FIG. 7) is directly coupled to the waveguide 250. Thus, the light energy from the laser is provided directly to the end of the waveguide 250 opposite from the ABS. In other embodiments, a grating (not shown) or other device may be used to couple light from the laser 104 into the EAMR transducer 220.

The waveguide 250 directs the energy from the laser 104 toward the ABS. More specifically, the core 254 directs energy from the laser 104 (not shown in FIG. 7) toward the NFT 230. The core 254 is configured to support the desired mode(s) of light energy in the waveguide 250 and, in the embodiment shown, runs the length, $l_1$, of the waveguide 250. Thus, the core 254 terminates at the ABS and the opposing end of the waveguide. In some embodiments, the thickness of the core, $t_1$, is on the order of one hundred fifty nanometers. However, other thicknesses may be used in other embodiments. As can be seen in the top view, the core 254 is also tapered. The core 254 has an index of refraction and may include materials such as $Ta_2O_5$, $TiO_2$, and $Si_3N4$. The cladding layers 252 and 256 typically have lower indices of refraction than the core 254. For example, the cladding layers 252 and 256 may include materials such as aluminum oxide, magnesium fluoride, and/or silicon oxide.

Assistant cores 260 and 262 reside in the cladding 256, while the assistant core 264 and 266 are in the cladding 252. In the embodiment shown, the positions and lengths of the assistant cores 260 and 262 are symmetric with respect to the positions and lengths of the assistant cores 266 and 264. Thus, the lengths and distances from the core 254 of the assistant cores 264 and 260 are the same. Similarly, the lengths and distances from the core 254 of the assistant cores 262 and 266 are the same. In addition, the lengths of the assistant cores 260, 262, 264, and 266 decrease with increasing distance from the core 254. The assistant cores 260, 262, 264, and 266 are shorter than the core 254, and thus do not extend to the ABS. In addition, in the embodiment shown the assistant cores 260, 262, 264, and 266 are tapered. Thus, at the end of the waveguide 250 opposite to the ABS, the assistant cores 260, 262, 264, and 266 have a width, w. This width decreases closer to the ABS. The width of the assistant cores 260, 262, 264, and 266 at the end opposite to the ABS is shown as equal to the width, w, of the core 254. However, in other embodiments, the assistant cores 260, 262, 264, and 266 may have other widths at the end opposite to the ABS. In other embodiments, the assistant cores 260, 262, 264, and 266 may also taper to a greater or lesser degree and may not taper at all. The assistant cores 260, 262, 264, and 266 have analogous lengths and distances from the core 254. However, in other embodiments, the lengths and/or distances from the core 254 of one or more of the assistant cores 260, 262, 264, and 266 may be different. In the embodiments shown, the shapes of the assistant cores 260, 262, 264, and 266 are the same (i.e. both triangular). However, in other embodiments, the shapes of the assistant cores 260, 262, 264, and 266 may differ. The assistant cores 260, 262, 264, and 266 have indices of refraction similar to that of the core 254 and may include materials such as $Ta_2O_5$, $TiO_2$, and $Si_3N4$. However, there is no requirement that the index of refraction one assistant cores 260, 262, 264, and 266 matches that of another assistant core 260, 262, 264, and/or 266. Further, there is no requirement that the indices of refraction of the assistant cores 260, 262, 264, and 266 be the same as that of the core 254. Although only four assistant cores 260, 262, 264, and 266 are shown, another number of assistant cores are possible. Finally, the assistant cores 260, 262, 264, and 266 are shown as thinner than the core 154''''. However, other thicknesses may be used in other embodiments.

The assistant cores 260, 262, 264, and 266 function in an analogous manner to the assistant cores 160/160'/160''/160''', 162/162'/162''/162''', and 164. Thus, the assistant cores 260, 262, 264, and 266 aid in coupling the energy from the laser (not shown in FIG. 7) into the waveguide 250. For example, the assistant cores 260, 262, 264, and 266 may form a taper (shown by a dashed line in the side view of FIG. 7) in the y and z directions. For the reasons discussed above with respect to the waveguide 250, the coupling efficiency and alignment tolerance of the waveguide 250 may be improved by the presence of the assistant cores 260, 262, 264, and 266.

Figure 8:
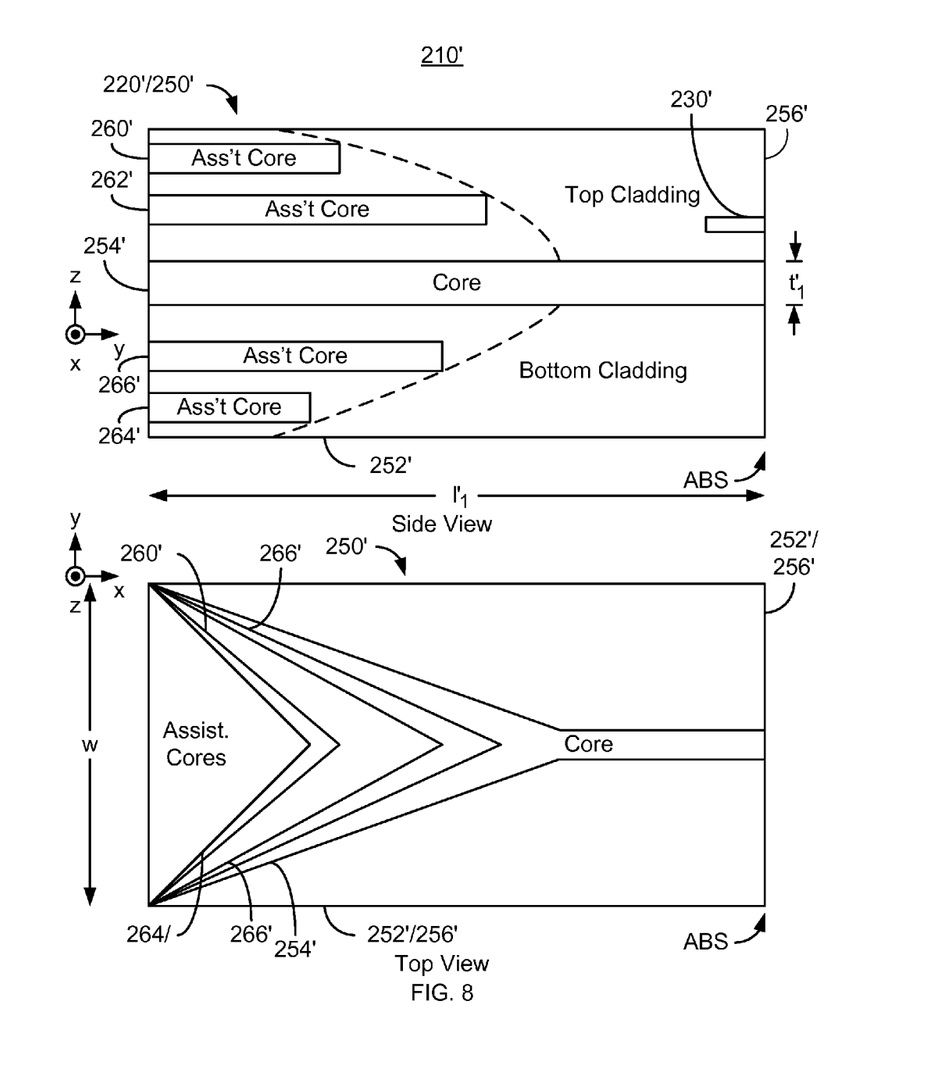
FIG. 8 is a diagram depicting another exemplary embodiment of a waveguide that may be used in an EAMR transducer.

FIG. 8 is a diagram depicting top and side views of another exemplary embodiment of a portion of the EAMR head 110/110'/110''/110'''/210 shown in FIGS. 2-7. Consequently, analogous components are labeled similarly. In particular, the waveguide 240' and NFT 230' are shown. In other embodiments, the NFT 230' might be omitted. For simplicity, FIG. 8 is not to scale. In addition, portions of the EAMR transducer 220' may be omitted in FIG. 8. For example, pole(s), coil(s), and/or shields may be omitted. In some embodiments, the laser (not shown in FIG. 8) is directly coupled to the waveguide 250'. Thus, the light energy from the laser is provided directly to the end of the waveguide 250' opposite from the ABS. In other embodiments, a grating (not shown) or other device may be used to couple light from the laser 104 into the EAMR transducer 220'.

The waveguide 250' includes cladding layers 252' and 256', core 254', and assistant cores 260', 262', 264', and 266'. The waveguide 250' directs the energy from the laser 104 toward the ABS. More specifically, the core 154'''' directs energy from the laser 104'''' (not shown in FIG. 8) toward the NFT 230'. The core 254' is configured to support the desired mode(s) of light energy in the waveguide 250' and, in the embodiment shown, runs the length, $l_1'$, of the waveguide 250'. Thus, the core 254' terminates at the ABS and the opposing end of the waveguide. In some embodiments, the thickness of the core, $t_1'$, is on the order of one hundred fifty nanometers. However, other thicknesses may be used in other embodiments. As can be seen in the top view, the core 254' is also tapered. The core 254' has an index of refraction and may include materials such as $Ta_2O_5$, $TiO_2$, and $Si_3N4$. The cladding layers 252' and 256' typically have lower indices of refraction than the core 254'. For example, the cladding layers 252' and 256' may include materials such as aluminum oxide, magnesium fluoride, and/or silicon oxide.

Assistant cores 260' and 262' reside in the cladding 256', while the assistant cores 264' and 266 are in the cladding 252'. In the embodiment shown, the lengths of the assistant cores 260', 262', 264', and 266' decrease with increasing distance from the core 254', forming a taper shown by the dashed line. However, the lengths of the cores 264' and 266' decrease more rapidly the lengths of the cores 260' and 262'. Thus, the profile of the dashed line in the cladding 252' is different than in the cladding 256'. The assistant cores 260', 262', 264', and 266' are shorter than the core 254', and thus do not extend to the ABS. In addition, in the embodiment shown the assistant cores 260', 262', 264', and 266' are tapered. Thus, at the end of the waveguide 250' opposite to the ABS, the assistant cores 260', 262', 264', and 266' have a width, w. This width decreases closer to the ABS. The width of the assistant cores 260', 262', 264', and 266' at the end opposite to the ABS is shown as equal to the width, w, of the core 254'. However, in other embodiments, the assistant cores 260', 262', 264', and 266' may have other widths at the end opposite to the ABS. In other embodiments, the assistant cores 260', 262', 264', and 266' may also taper to a greater or lesser degree and may not taper at all. In the embodiments shown, the shapes of the assistant cores 260', 262', 264', and 266' are the same (i.e. both triangular). However, in other embodiments, the shapes of the assistant cores 260', 262', 264', and 266' may differ. The assistant cores 260', 262', 264', and 266' have indices of refraction similar to that of the core 254' and may include materials such as $Ta_2O_5$, $TiO_2$, and $Si_3N4$. However, there is no requirement that the index of refraction one assistant cores 260', 262', 264', and 266' match that of another assistant core 260', 262', 264', and/or 266'. Further, there is no requirement that the indices of refraction of the assistant cores 260', 262', 264', and 266' be the same as that of the core 254'. Although only four assistant cores 260', 262', 264', and 266' are shown, another number of assistant cores are possible. Finally, the assistant cores 260', 262', 264', and 266' are shown as thinner than the core 254'. However, other thicknesses may be used in other embodiments.

The assistant cores 260', 262', 264', and 266' function in an analogous manner to the assistant cores 160/160'/160''/160'''/260, 162/162'/162''/162'''/262, 164/264, and 266. Thus, the assistant cores 260', 262', 264', and 266' aid in coupling the energy from the laser (not shown in FIG. 8) into the waveguide 250'. For example, the assistant cores 260', 262', 264', and 266' may form a taper shown by a dashed line in the side view of FIG. 8) in the y and z directions. For the reasons discussed above with respect to the waveguide 150/150'/150''/150'''/250, the coupling efficiency and alignment tolerance of the waveguide 250' may be improved by the presence of the assistant cores 260', 262', 264', and 266'.

Figure 9:
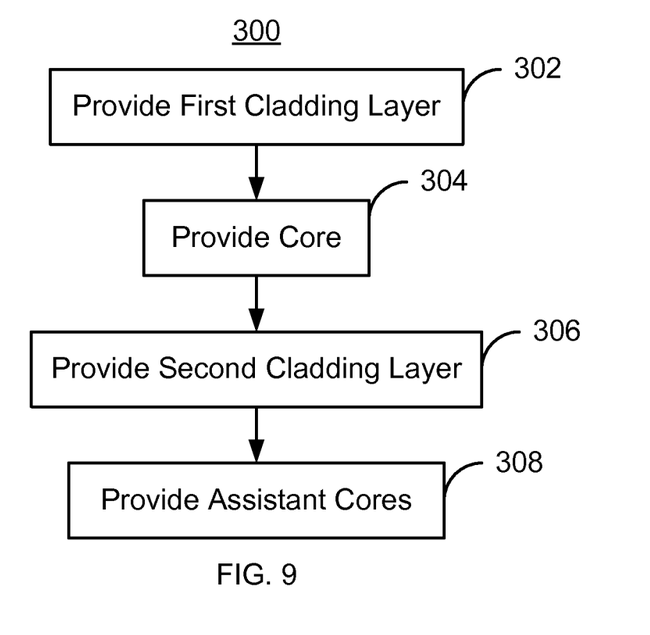
FIG. 9 is a flow chart depicting an exemplary embodiment of a method for fabricating a waveguide that may be used in an EAMR transducer.

FIG. 9 depicts an exemplary embodiment of a method 300 of forming a portion of an EAMR head. For simplicity, some steps may be omitted, combined, and/or performed in another sequence. The method 300 is described in the context of the EAMR disk drive 100, EAMR head 110, and EAMR transducer 120. However, the method 300 may be used to fabricate other EAMR heads including but not limited to the EAMR heads 110', 110'', 110''', 210, and/or 210'. In addition, the method 300 is described in the context of fabricating a single disk drive 100. However, multiple transducers may be fabricated substantially in parallel. Further, although described as separate steps, portions of the method 300 may be interleaved.

A first cladding layer 152 is provided, via step 302. Step 302 may include depositing a dielectric layer, such as aluminum oxide, magnesium fluoride, and/or silicon oxide. A core 154 configured to direct the energy from the laser 104 toward the ABS is provided, via step 304. Step 304 may include depositing the core material(s) described above as well as patterning the materials, if desired. The second cladding layer 156 is also provided, via step 306. Step 306 may include depositing the material(s) for the second cladding layer 156 on the core 154.

The assistant cores 160 and 162 are provided, via step 308. Providing the assistant cores 160 and 162 may include depositing the desired materials as well as patterning the materials so that the assistant cores 160 and 162 have the desired shape. Further, step 308 may be interleaved with portions of steps 302 and 306 such that the assistant cores 160 and 162 are embedded in the cladding 152 and 156.

Using the method 300, the EAMR transducers 120, 120', 120'', 120''', 220 and/or 220' may be obtained. Consequently, the benefits of such devices may be achieved.

We claim:

1. A waveguide for use in an energy assisted magnetic recording (EAMR) transducer coupled with a laser for providing energy and having an air-bearing surface (ABS) configured to reside in proximity to a media during use, the EAMR transducer including a write pole configured to write to a region of the media, and at least one coil for energizing the write pole, the waveguide comprising:
- a first cladding layer;
- a core configured to direct the energy from the laser toward the ABS, the core having a core length;
- a second cladding layer, the core residing between the first cladding layer and the second cladding layer; and
- a plurality of assistant cores, a first portion of the plurality of assistant cores residing in the first cladding layer, a second portion of the plurality of assistant cores residing in the second cladding layer, each of the plurality of assistant cores having an assistant core length less than the core length, at least a portion of the first cladding layer residing between the first portion of the plurality of assistant cores and the core, at least a second portion of the second cladding layer residing between the second portion of the plurality of assistant cores and the core.

2. The waveguide of claim 1 wherein the core extends to the ABS and wherein none of the plurality of assistant cores extend to the ABS.

3. The waveguide of claim 2 wherein the plurality of assistant cores all terminate at an assistant core distance from the ABS.

4. A waveguide for use in an energy assisted magnetic recording (EAMR) transducer coupled with a laser for providing energy and having an air-bearing surface (ABS) configured to reside in proximity to a media during use, the EAMR transducer including a write pole configured to write to a region of the media, and at least one coil for energizing the write pole, the waveguide comprising:
- a first cladding layer;
- a core configured to direct the energy from the laser toward the ABS, the core having a core length;
- a second cladding layer, the core residing between the first cladding layer and the second cladding layer; and
- a plurality of assistant cores, a first portion of the plurality of assistant cores residing in the first cladding layer, a second portion of the plurality of assistant cores residing in the second cladding layer, each of the plurality of assistant cores not extending to the ABS and having an assistant core length less than the core length;
- wherein the assistant core length of each of the first portion of the plurality of assistant cores decreases with increasing distance from the core.

5. A waveguide for use in an energy assisted magnetic recording (EAMR) transducer coupled with a laser for providing energy and having an air-bearing surface (ABS) configured to reside in proximity to a media during use, the EAMR transducer including a write pole configured to write to a region of the media, and at least one coil for energizing the write pole, the waveguide comprising:
- a first cladding layer;
- a core configured to direct the energy from the laser toward the ABS, the core having a core length;
- a second cladding layer, the core residing between the first cladding layer and the second cladding layer; and
- a plurality of assistant cores, a first portion of the plurality of assistant cores residing in the first cladding layer, a second portion of the plurality of assistant cores residing in the second cladding layer, each of the plurality of assistant cores not extending to the ABS and having an assistant core length less than the core length;
- wherein the assistant core length of each of the second portion of the plurality of assistant cores decreases with increasing distance from the core.

6. The waveguide of claim 5 wherein each of the second portion of the plurality of assistant cores corresponds to one of the first portion of the plurality of assistant cores, the one of the first portion of the plurality of assistant cores having a matching assistant core length and distance from the core.

7. The waveguide of claim 1 wherein the plurality of assistant cores includes an even number of assistant cores.

8. The waveguide of claim 7 wherein the plurality of assistant cores includes four assistant cores.

9. The waveguide of claim 1 wherein the plurality of assistant cores includes an odd number of assistant cores.

10. An energy assisted magnetic recording (EAMR) transducer coupled with a laser for providing energy and having an air-bearing surface (ABS) configured to reside in proximity to a media during use, the EAMR transducer comprising:
- a write pole configured to write to a region of the media;
- at least one coil for energizing the write pole;
- a near field transducer (NFT) proximate to the ABS for focusing the energy onto the region of the media; and
- a waveguide including a first cladding layer, a second cladding layer, a core, and a plurality of assistant cores, the core configured to direct the energy from the laser toward the ABS, having a core length, and residing between the first cladding layer and the second cladding layer, a first portion of the plurality of assistant cores residing in the first cladding layer, a second portion of the plurality of assistant cores residing in the second cladding layer, each of the plurality of assistant cores having an assistant core length less than the core length, at least a portion of the first cladding layer residing between the first portion of the plurality of assistant cores and the core, at least a second portion of the second cladding layer residing between the second portion of the plurality of assistant cores and the core.

11. The EAMR transducer of claim 10 wherein the core extends to the ABS and wherein none of the plurality of assistant cores extend to the ABS.

12. The EAMR transducer of claim 11 wherein wherein the plurality of assistant cores terminate all at an assistant core distance from the ABS.

13. An energy assisted magnetic recording (EAMR) transducer coupled with a laser for providing energy and having an air-bearing surface (ABS) configured to reside in proximity to a media during use, the EAMR transducer comprising:
- a write pole configured to write to a region of the media;
- at least one coil for energizing the write pole;
- a near field transducer (NFT) proximate to the ABS for focusing the energy onto the region of the media; and
- a waveguide including a first cladding layer, a second cladding layer, a core, and a plurality of assistant cores, the core configured to direct the energy from the laser toward the ABS, having a core length, and residing between the first cladding layer and the second cladding layer, a first portion of the plurality of assistant cores residing in the first cladding layer, a second portion of the plurality of assistant cores residing in the second cladding layer, each of the plurality of assistant cores not extending to the ABS and having an assistant core length less than the core length;
- wherein the assistant core length of each of the first portion of the plurality of assistant cores decreases with increasing distance from the core.

14. An energy assisted magnetic recording (EAMR) transducer coupled with a laser for providing energy and having an air-bearing surface (ABS) configured to reside in proximity to a media during use, the EAMR transducer comprising:
  a write pole configured to write to a region of the media;
  at least one coil for energizing the write pole;
  a near field transducer (NFT) proximate to the ABS for focusing the energy onto the region of the media; and
  a waveguide including a first cladding layer, a second cladding layer, a core, and a plurality of assistant cores, the core configured to direct the energy from the laser toward the ABS, having a core length, and residing between the first cladding layer and the second cladding layer, a first portion of the plurality of assistant cores residing in the first cladding layer, a second portion of the plurality of assistant cores residing in the second cladding layer, each of the plurality of assistant cores not extending to the ABS and having an assistant core length less than the core length;
  wherein the assistant core length of each of the second portion of the plurality of assistant cores decreases with increasing distance from the core.

15. The EAMR transducer of claim 14 wherein each of the second portion of the plurality of assistant cores corresponds to one of the first portion of the plurality of assistant cores, the one of the first portion of the plurality of assistant cores having a matching assistant core length and distance from the core.

16. The EAMR transducer of claim 10 wherein the plurality of assistant cores includes an even number of assistant cores.

17. The EAMR transducer of claim 10 wherein the plurality of assistant cores includes an odd number of assistant cores.

18. An energy assisted magnetic recording (EAMR) disk drive comprising:
  a laser for providing energy;
  a media;
  a slider including an EAMR transducer optically coupled with the laser and having an air-bearing surface (ABS) configured to reside in proximity to the media during use, the EAMR transducer including a write pole, at least one coil, a near-field transducer (NFT), and a waveguide, the write pole configured to write to a region of the media, the at least one coil for energizing the write pole, the NFT proximate to the ABS for focusing the energy onto the region of the media, the waveguide including a first cladding layer, a second cladding layer, a core, and a plurality of assistant cores, the core configured to direct the energy from the laser toward the ABS, having a core length, and residing between the first cladding layer and the second cladding layer, a first portion of the plurality of assistant cores residing in the first cladding layer, a second portion of the plurality of assistant cores residing in the second cladding layer, each of the plurality of assistant cores having an assistant core length less than the core length, at least a portion of the first cladding layer residing between the first portion of the plurality of assistant cores and the core, at least a second portion of the second cladding layer residing between the second portion of the plurality of assistant cores and the core.

19. A method for providing a waveguide for use in an energy assisted magnetic recording (EAMR) transducer coupled with a laser for providing energy and having an air-bearing surface (ABS) configured to reside in proximity to a media during use, the EAMR transducer including a write pole configured to write to a region of the media, and at least one coil for energizing the write pole, the method comprising:
  providing a first cladding layer;
  providing a core configured to direct the energy from the laser toward the ABS, the core having a core length;
  providing a second cladding layer, the core residing between the first cladding layer and the second cladding layer; and
  providing a plurality of assistant cores, a first portion of the plurality of assistant cores residing in the first cladding layer, a second portion of the plurality of assistant cores residing in the second cladding layer, each of the plurality of assistant cores having an assistant core length less than the core length, at least a portion of the first cladding layer residing between the first portion of the plurality of assistant cores and the core, at least a second portion of the second cladding layer residing between the second portion of the plurality of assistant cores and the core.

20. The method of claim 19 wherein the core extends to the ABS and wherein none of the plurality of assistant cores extend to the ABS.

21. The method of claim 20 wherein the plurality of assistant cores all terminate at an assistant core distance from the ABS.

22. A method for providing a waveguide for use in an energy assisted magnetic recording (EAMR) transducer coupled with a laser for providing energy and having an air-bearing surface (ABS) configured to reside in proximity to a media during use, the EAMR transducer including a write pole configured to write to a region of the media, and at least one coil for energizing the write pole, the method comprising:
  providing a first cladding layer;
  providing a core configured to direct the energy from the laser toward the ABS, the core having a core length;
  providing a second cladding layer, the core residing between the first cladding layer and the second cladding layer; and
  providing a plurality of assistant cores, a first portion of the plurality of assistant cores residing in the first cladding layer, a second portion of the plurality of assistant cores residing in the second cladding layer, each of the plurality of assistant cores having an assistant core length less than the core length, wherein the step of providing the plurality of assistant cores further includes:
  setting the assistant core length of each of the first portion of the plurality of assistant cores decreases with increasing distance from the core.

23. A method for providing a waveguide for use in an energy assisted magnetic recording (EAMR) transducer coupled with a laser for providing energy and having an air-bearing surface (ABS) configured to reside in proximity to a media during use, the EAMR transducer including a write pole configured to write to a region of the media, and at least one coil for energizing the write pole, the method comprising:
  providing a first cladding layer;
  providing a core configured to direct the energy from the laser toward the ABS, the core having a core length;
  providing a second cladding layer, the core residing between the first cladding layer and the second cladding layer; and
  providing a plurality of assistant cores, a first portion of the plurality of assistant cores residing in the first cladding layer, a second portion of the plurality of assistant cores residing in the second cladding layer, each of the plurality of assistant cores having an assistant core length less than the core length, wherein the step of providing the plurality of assistant cores further includes:

setting the assistant core length of each of the second portion of the plurality of assistant cores decreases with increasing distance from the core.

24. The method of claim 23 wherein the step of providing the plurality of assistant cores further includes:
configuring each of the second portion of the plurality of assistant cores to correspond to one of the first portion of the plurality of assistant cores, the one of the first portion of the plurality of assistant cores having a matching assistant core length and distance from the core.

25. The method of claim 19 wherein the plurality of assistant cores includes an even number of assistant cores.

26. The method of claim 19 wherein the plurality of assistant cores includes an odd number of assistant cores.

27. An energy assisted magnetic recording (EAMR) disk drive comprising:
a laser for providing energy;
a media;
a slider including an EAMR transducer optically coupled with the laser and having an air-bearing surface (ABS) configured to reside in proximity to the media during use, the EAMR transducer including a write pole, at least one coil, a near-field transducer (NFT), and a waveguide, the write pole configured to write to a region of the media, the at least one coil for energizing the write pole, the NFT proximate to the ABS for focusing the energy onto the region of the media, the waveguide including a first cladding layer, a second cladding layer, a core, and a plurality of assistant cores, the core configured to direct the energy from the laser toward the ABS, having a core length, and residing between the first cladding layer and the second cladding layer, a first portion of the plurality of assistant cores residing in the first cladding layer, a second portion of the plurality of assistant cores residing in the second cladding layer, each of the plurality of assistant cores having an assistant core length less than the core length, the assistant core length of each of the first portion of the plurality of assistant cores decreases with increasing distance from the core.

* * * * *